United States Patent
Dow et al.

(10) Patent No.: US 9,575,554 B1
(45) Date of Patent: Feb. 21, 2017

(54) DYNAMIC TIME SLICED SENSOR SAMPLING FOR REDUCED POWER CONSUMPTION

(71) Applicant: International Business Machines Corporation, Armonk, NY (US)

(72) Inventors: Eli M. Dow, Wappingers Falls, NY (US); Michael R. Kelly, Albany, NY (US); Harry R. Kolar, Scottsdale, AZ (US); Michael L. Passow, West Hurley, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 7 days.

(21) Appl. No.: 14/969,092

(22) Filed: Dec. 15, 2015

(51) Int. Cl.
*G06F 1/32* (2006.01)
*G01D 11/00* (2006.01)

(52) U.S. Cl.
CPC ........... *G06F 1/3296* (2013.01); *G01D 11/00* (2013.01)

(58) Field of Classification Search
CPC ............................. G06F 1/3296; G01D 11/00
USPC ......................................................... 702/187
See application file for complete search history.

(56) References Cited

U.S. PATENT DOCUMENTS

| | | |
|---|---|---|
| 5,218,704 A | 6/1993 | Watts, Jr. et al. |
| 6,609,083 B2 | 8/2003 | Enck et al. |
| 7,111,179 B1 * | 9/2006 | Girson ................. G06F 1/3203 320/130 |
| 8,051,310 B2 | 11/2011 | He et al. |
| 8,601,483 B2 | 12/2013 | He et al. |
| 8,874,409 B2 | 10/2014 | Dhurandhar et al. |
| 2013/0297258 A1 | 11/2013 | Sadasivam et al. |
| 2014/0019397 A1 | 1/2014 | Alexander |
| 2014/0184273 A1 | 7/2014 | Feizi-Khankandi et al. |
| 2016/0026235 A1 * | 1/2016 | Li .............................. G06F 1/28 713/323 |

OTHER PUBLICATIONS

Abdel-Aal, Energy Saving and Reiable Data Reduction Techniques for Single and Multiple M0dal WSN, 2012, IEEE.*

* cited by examiner

*Primary Examiner* — Michael Nghiem
*Assistant Examiner* — Peter Ngo
(74) *Attorney, Agent, or Firm* — Cantor Colburn LLP; Steven Chiu (57) ABSTRACT

An aspect of the disclosure includes a method, a system and a computer program product. The method includes measuring a first data with a sensor, the sensor and operatively coupled computing resources having at least two power states, an operating power state and a low power state, the low power state consuming less energy than the operating power state. A first time period is determined for measuring a second data, the first time period being based at least in part on the first data. The sensor is operated, and operatively coupled computing resources at the low power state during the first time period, wherein no data measurements are acquired during the first time period. The sensor is changed to the operating power state at an expiration of the first time period.

20 Claims, 5 Drawing Sheets

DYNAMIC TIME SLICED SENSOR SAMPLING FOR REDUCED POWER CONSUMPTION

BACKGROUND

The present invention relates generally to autonomous sensors and, more specifically, to autonomous sensors with dynamic sampling rates that reduce power consumption.

Autonomous sensors are used in a variety of applications for the monitoring of conditions. Typically, these sensors measure a parameter and transmit a signal with the data back to a centralized server. Batteries are typically coupled to the sensors to provide energy for operations. In some applications, a renewable energy source, such as a solar panel may be coupled to recharge the battery and extend the operable life of the sensor.

SUMMARY

Embodiments include a method, system, and computer program product for operating a sensor. The method includes measuring a first data with a sensor, the sensor and operatively coupled computing resources having at least two power states, an operating power state and a low power state, the low power state consuming less energy than the operating power state. A first time period is determined for measuring a second data, the first time period being based at least in part on the first data. The sensor is operated, and operatively coupled computing resources at the low power state during the first time period, wherein no data measurements are acquired during the first time period. The sensor is changed to the operating power state at an expiration of the first time period.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments of the present disclosure provide for a sensor that acquires measurement data observations. Embodiments provide for a sensor and a method of operating the sensor that changes between power states to conserve energy. The changes between power states are determined based on a forecast for the acquisition of the next observation where the forecast is based on historical observation data.

Figure 1:
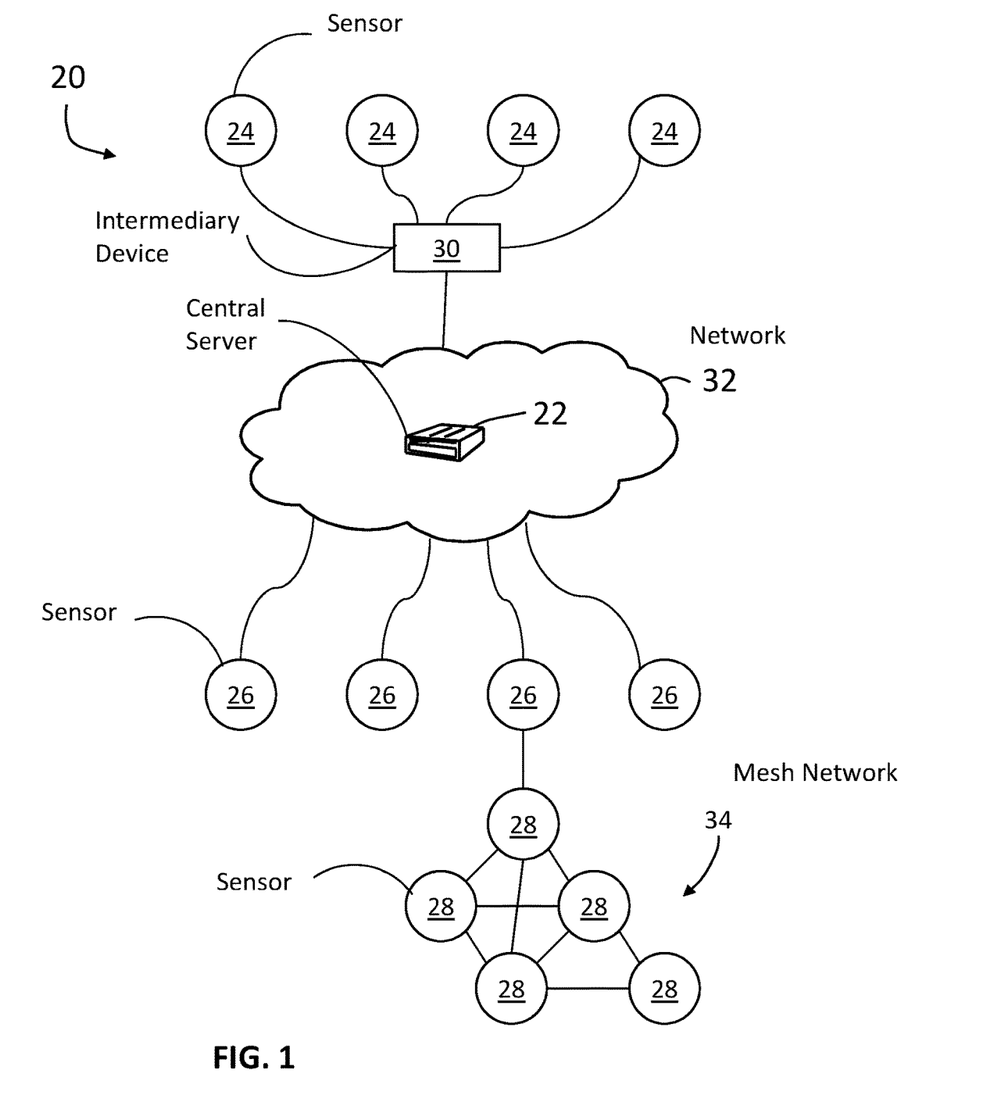
FIG. 1 depicts a sensor network in accordance with some embodiments of the present disclosure.

Referring now to FIG. 1 an embodiment of a system 20 for an exemplary sensor system that includes a plurality of autonomous sensors. The system 20 includes a central server 22 that is configured to receive data signals from remote sensors, such as autonomous sensors 24, 26, 28 for example. It should be appreciated that while embodiments herein describe the central server 22 as a single computing device, this is for exemplary purposes and the claimed inventions should not be so limited. In other embodiments, the central server 22 may be comprised of a plurality of servers arranged in a single data center or in a distributed computing environment. In an embodiment, the central server 22 may be connected to the autonomous sensors via a network 32, such as a cloud network, a cellular network, a local area network or a wide area network for example. It should be appreciated that although this disclosure includes a description for coupling the sensors to the central server 22 via cloud computing, implementation of the teachings recited herein are not limited to a cloud computing environment. Rather, embodiments of the present invention are capable of being implemented in conjunction with any other type of computing environment now known or later developed.

It should be appreciated that sensors 24, 26, 28 may be coupled to the central server in a variety of manners. Sensors 24 transmit data through an intermediary device 30. The intermediary device 30 includes, but is not limited to a repeater, a switch, a collector, a router and a gateway for example. The primary function of the intermediary device 30 is relay or otherwise forward data signals to the central server 22. Sensors 26 may have a direct connection to the network 32. Some sensors, such as sensors 28 for example, may be connected in a mesh communications network 34. A mesh network 34 includes ad-hoc, multi-hop, self-configuring networks that transmit data signals via peer-to-peer connects back to the central server 22. It should be appreciated that the sensors 24, 26, 28 may be configured in other topologies, such as but not limited to point-to-point topology, star topology, tree topology, ring topology, bus topology, daisy-chain topology.

Figure 2:
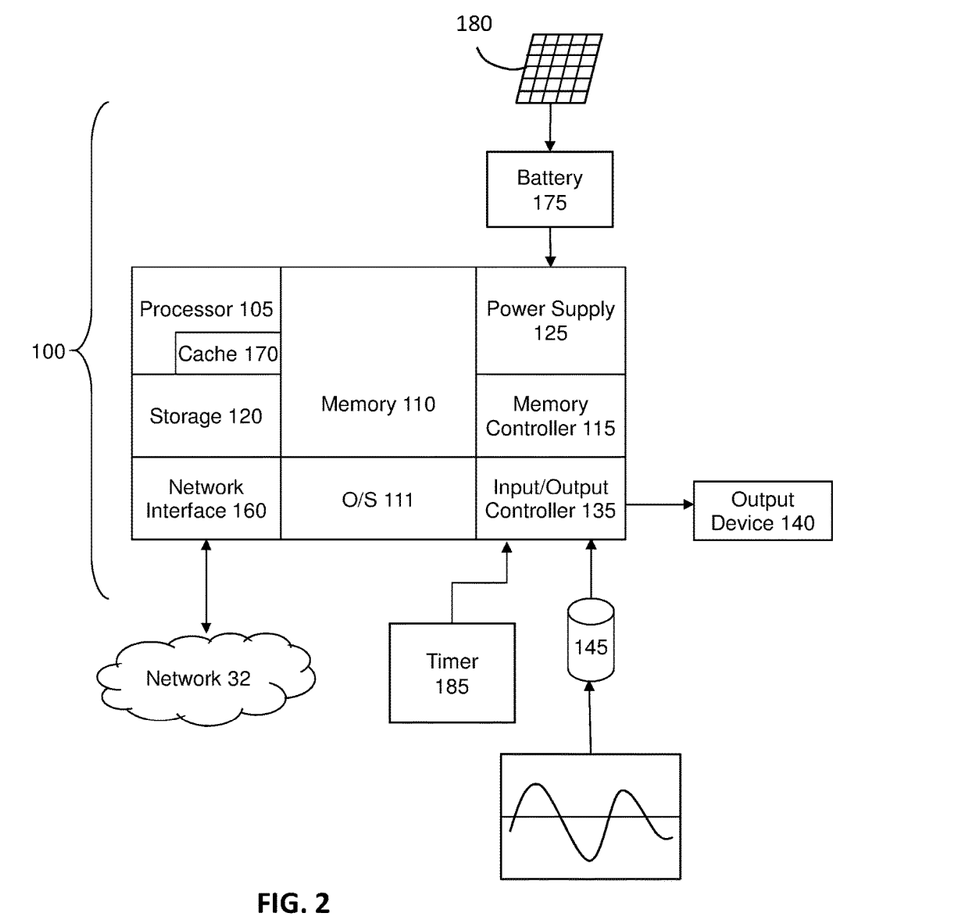
FIG. 2 depicts a schematic diagram of a sensor in accordance with some embodiments of the present disclosure.

Turning now to FIG. 2, an autonomous sensor 100 for use with the system 20 is generally shown in accordance with an embodiment. FIG. 2 illustrates a block diagram of a autonomous sensor 100 for use in implementing a system or method according to some embodiments. The systems and methods described herein may be implemented in hardware, software (e.g., firmware), or a combination thereof. In some embodiments, the methods described may be implemented, at least in part, in hardware and may be part of the microprocessor of a special or general-purpose computing device.

In some embodiments, as shown in FIG. 2, the sensor 100 includes a processor 105, memory 110 coupled to a memory controller 115, and one or more input devices 145, output devices 140 and/or camera 26, which are communicatively coupled via a local I/O controller 135. The devices 145 may include, for example, one or more measurement device, such as a thermocouple, a thermistor, a pressure transducer, a humidistat, a barometer, an anemometer, a rain sensor, a compass, and the like. Input devices such as a conventional keyboard 150 and mouse 155 may be coupled to the I/O controller 135. The I/O controller 135 may be, for example, one or more buses or other wired or wireless connections, as are known in the art. The I/O controller 135 may have additional elements, which are omitted for simplicity, such as controllers, buffers (caches), drivers, repeaters, and receivers, to enable communications.

The I/O devices 140, 145 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 105 is a hardware device for executing hardware instructions or software, particularly those stored in memory 110. The processor 105 may be a custom made or commercially available processor, a central processing unit (CPU), an auxiliary processor among several processors associated with the sensor 100, a semiconductor based microprocessor (in the form of a microchip or chip set), a macroprocessor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, etc.).

The memory 110 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 2, the instructions in the memory 110 include a suitable operating system (OS) 111. The operating system 111 essentially may control the execution of other computer programs and provides scheduling, input-output control, file and data management, memory management, and communication control and related services.

Additional data, including, for example, instructions for the processor 105 or other retrievable information, may be stored in storage 120, which may be a storage device such as a hard disk drive or solid state drive. The stored instructions in memory 110 or in storage 120 may include those enabling the processor to execute one or more aspects of the systems and methods of this disclosure.

The sensor 100 may further include a network interface 160 for coupling to a network 32 or otherwise operatively coupled to a computing device with a network connection. As discussed herein, signals including data measured by the input devices 145 are transmitted to the central server 22 via the network 32. In the exemplary embodiment, the sensor 100 includes a power supply 125 that controls and manages the distribution of electrical power from a battery 175. The battery 175 may be, but is not limited to a lead-acid battery, a lithium-ion battery, a nickel-cadmium battery for example.

In the exemplary embodiment, the battery 175 is a rechargeable battery that is coupled to an external renewable-energy power source 180, such as a solar panel for example. The power source 180 provides electrical power to the battery 175 on a periodic or aperiodic basis to replenish the energy consumed by the sensor 100 during operation. As discussed in more detail herein, some of the embodiments provide for the sensor 100 to have at least two operating states, such as an operating power state and a low power state. In the operating power state, the sensor 100 is operating and performing functions such as acquiring measurements from the measurement devices 145 and transmitting or receiving signals via interface 160.

In the low power state, the sensor 100 performs with reduced functionality to conserve energy stored within battery 175. In an embodiment, when in the low power state, the sensor 100 operates a timer 185 that tracks time periods and initiates a change in the sensor 100 to the operating power state based upon predetermined criteria. In an embodiment, the change in state is initiated using an interrupt transmitted to the processor 105.

Systems and methods according to this disclosure may be embodied, in whole or in part, in computer program products or in sensor 100, such as that illustrated in FIG. 2. Some of the embodiments provide for a method of operating the sensor 100 to reduce the amount of energy used to reduce the battery capacity, extend the operational life of the sensor, or reduce the size of the renewable power source 180. This method includes obtaining an initial number of measurement data or observations and forecasting a future measurement data or observations based on the initial number of observations. A time period, or sampling interval, is determined for when the forecast observations is expected to change by a predetermined variance or threshold. The power state of sensor 100 is changed to the low power state for the duration of the time period. When the time period expires, the state of the sensor 100 is changed to the operating power state and additional observations are acquired. This observation is stored and used in combination with earlier observations to forecast a new future observations and an associated time period. When the observations are equal to or crosses a threshold, the sensor 100 may report the acquired observations to the central server 22. In an embodiment, both the stored observations and the transmitted observations include a time and date data for each of the observations.

Figure 3:
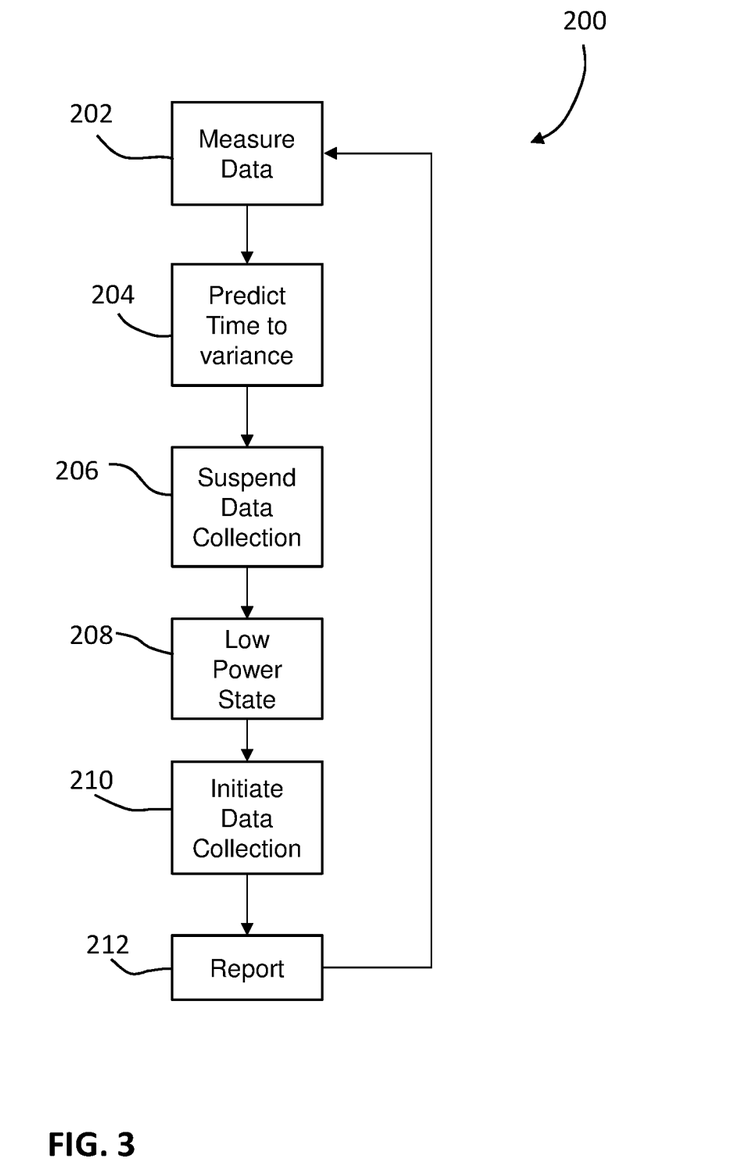
FIG. 3 depicts a flow diagram of a method for operating a sensor in accordance with some embodiments of the present disclosure.

Referring now to FIG. 3, a method 200 is illustrated for operating the sensor 100. The method begins in block 202 with the acquisition of observations. In an embodiment, the observations include the measured parameter (e.g. air temperature) and the date and time the measurement was performed. In still a further embodiment, initially a plurality of observations may be acquired. The method 200 then proceeds to block 204 where the time period is determined based on a forecast of when the observations will vary or change by a predetermined amount. In an embodiment, the forecast is performed using a time series prediction, such as a univariate or a multivariate analysis for example. In an embodiment, the forecast of the time period may include analyzing the stored observations for trends and the forecast of the time period is based on when the observations vary or change from the trend. Forecasting techniques may be a stochastic regime or deterministic in nature.

The method 200 then proceeds to block 206 where observations are suspended and the sensor 100 is changed to a low power state in block 208. The sensor 100 remains in the low power state for the forecast time period. Upon the expiration of the forecast time period, the sensor 100 is changed to an operational power state and observations are acquired in block 210. The method 200 then proceeds to block 212 where the observation is transmitted to the central server 22. The method 200 then loops back to block 202 where the method begins again. It should be appreciated that as the additional observations are acquired and stored, the time period forecast may change due to the additional observations. Further, additional trend information may become apparent, such as temporal trends (e.g. day vs. night) for example.

Figure 4:
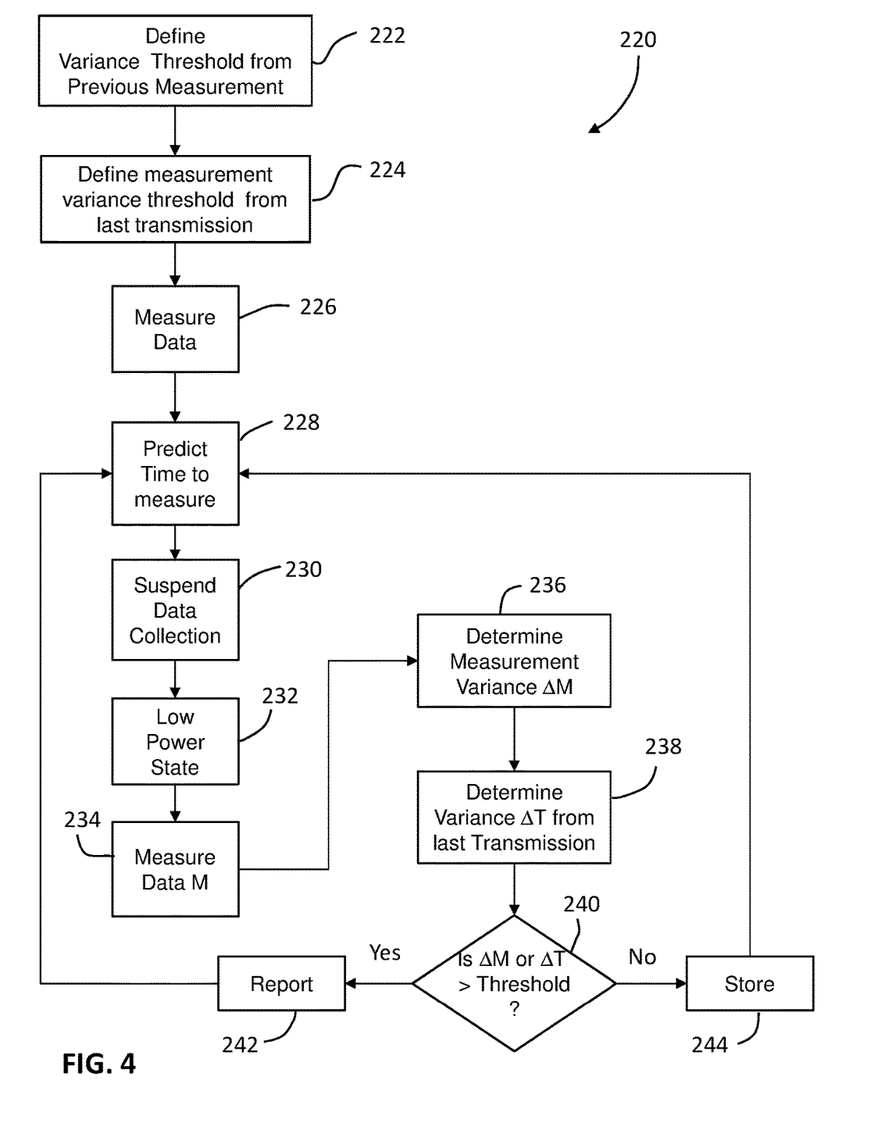
FIG. 4 depicts a flow diagram of a method of operating a sensor in accordance with some embodiments of the present disclosure.

Referring now to FIG. 4, another method 220 is shown for operating sensor 100. The method 220 starts in block 222 where a value variance threshold from a previous observation is defined. In an embodiment, the value variance threshold is defined by a system operator and transmitted from the central server 22 to the sensor 100. In another embodiment, the value variance threshold is determined based on a predetermined percentage of the observation value (e.g. 10%). The method 220 then proceeds to block 224 where a transmission variance threshold is defined, the transmission variance threshold being an amount of change in the value of the observation since the last transmission of observations to the central server 22. In an embodiment, the transmission variance threshold may be a defined by the system operator and transmitted by the central server 22 to the sensor 100. In another embodiment, the transmission variance threshold is a predetermined percentage of the observation value. In still further embodiments, the value variance threshold or transmission variance thresholds may also include: absolute difference (e.g. a sensibility limit 5 degrees F.); absolute values (e.g. water freezing point at 32 degrees F.); a rate of slope change between measurements (percentage or absolute); and slope change/first derivative inflection point(s) when not expected due to known periodic trends.

The method 220 then proceeds to block 226 where initial observations are acquired from the measurement devices 145. In an embodiment, a predetermined amount of observations are acquired to provide a basis for performing a forecasting analysis. In an embodiment, the initial observation is performed prior to the defining of the value variance threshold and the transmission variance threshold. In this embodiment, the observations are acquired at fixed intervals and this initial observation is used to determine the value variance threshold and the transmission variance threshold.

The method 220 then proceeds to block 228 where a time period is forecast for when a sufficiently different measurement is likely to occur, as defined by the value variance threshold and the transmission variance threshold. In an embodiment, the forecasting may be based on a variety of factors, such as those shown in FIG. 5. These factors include analysis of the historical observations to determine if there is a periodicity 250 in the historical observations. For example, temperature data may show a temporal trend or periodicity between daytime temperatures and night time temperatures. Periodicity may also account for diurnal, seasonal, or annual trends in data.

Figure 5:
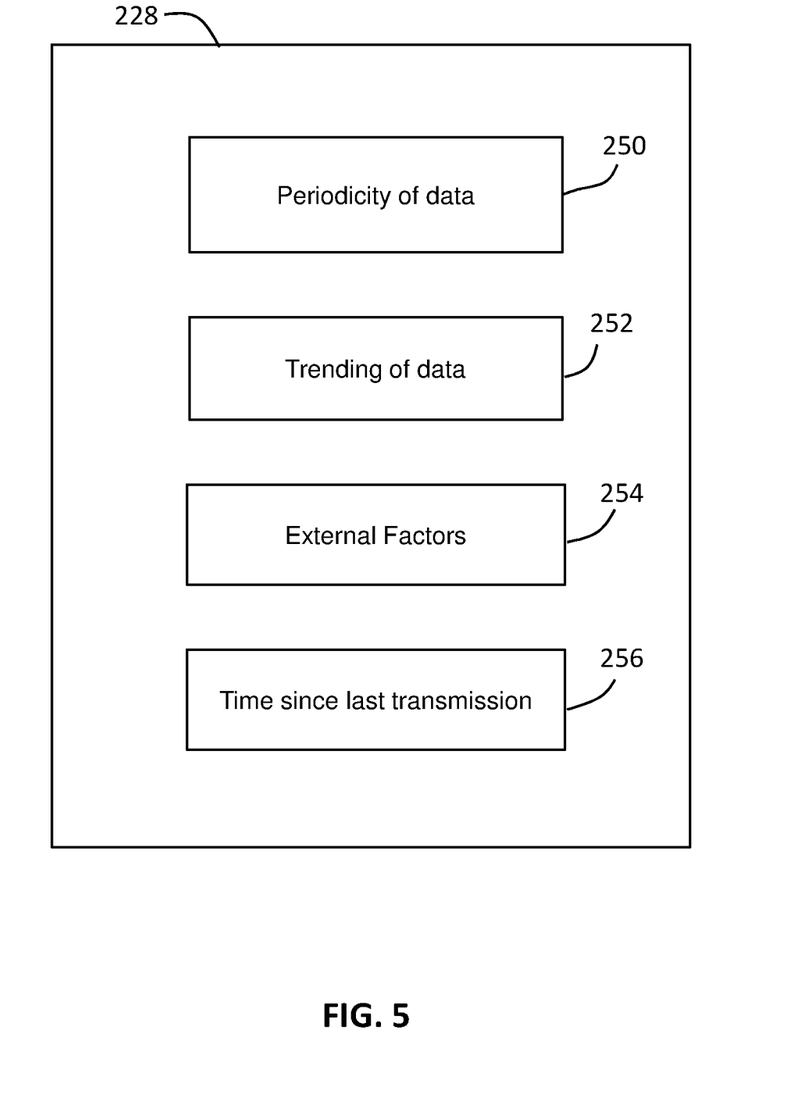
FIG. 5 depicts a portion of the flow diagram of FIG. 4 for forecasting a time to acquire observations, according to some embodiments of the present disclosure.

Another factor that may be analyzed are trends 252 in the historical observations. For example, if the temperatures have been increasing at a constant rate for the past hour then the next temperature reading may be expected to follow this trend. Still another factor that may be analyzed is data based on external factors 254. In an embodiment, the weather information may be received by the sensor 100 and used to determine how often observations are acquired. In an embodiment, the weather data may be used to predict the amount of solar gain that the solar panel 180 will receive during an upcoming time period (e.g. the next day). Based on the expected amount of energy that the battery 175 will receive from the solar panel 180, the time period may be arranged to ensure that the sensor 100 does not deplete the battery 175 due to the acquisition of observations and transmission of signals.

In an embodiment, another factor that may be accounted for in the determination of the time period is the time since the last transmission of observations 256. In this embodiment, the system 20 may desire to receive a signal from each of the sensors on a periodic or aperiodic basis to ensure that the sensors are still operational. In an embodiment, the method 220 may limit the time period to the acquisition of the next observation based on the time since the last transmission of a signal to the central server 22 and a predetermined reporting time period.

Once the time period has been determined, the method 220 proceeds to block 230 where the acquisition of observations suspended and the sensor 100 is changed to a low power state in block 232. While in the low power state, the sensor 100 disables or turns off circuits or modules within the sensor 100 to reduce power usage. It should be appreciated that the timer circuit 185 remains operational. The sensor 100 stays in the low power state for the time period determined in block 226. Upon expiration of the time period, the sensor 100 is changed to an operating power state. In an embodiment, the change of states is initiated by an interrupt signal from the timer circuit 185.

Upon changing to the operational power state, the sensor 100 acquires an observation in block 134. The method 220 then proceeds to block 236 where the variance in the observation from the last measurement ($\Delta M = M_t - M_{t-1}$). The variance in the measurement from the last signal transmission to the central server 22 is then determined in block 238 ($\Delta T = T_t - T_{t-1}$).

The method 220 then proceeds to query block 240 where the variances $\Delta M$ and $\Delta T$ compared to the value variance threshold and the transmission variance threshold determined in block 222 and block 224 respectively. When one of the variances is equal to or exceeds the threshold, the method 220 proceeds to block 242 and transmits a signal with the acquired observation. In an embodiment, the transmission of the signal includes all of the observation acquired since the last transmission to the central server 22. The method 220 then proceeds back to block 228 where a new forecast is performed to determine a new time period and the process repeats.

When the query block 240 returns a negative, meaning the current acquired observation is less than one of the value variance threshold and the transmission variance threshold, the method 220 proceeds to block 220 where the current acquired observation is stored in block 244. The method 220 then loops back to block 228 where a new forecast is performed to determine a new time period and the process repeats.

In an embodiment, the initial observations may be used to determine the bounds of the time series forecast. It should be appreciated that in some embodiments, the forecast analysis is a load on the processor 105. Therefore the performance of the analysis increases the energy usage of the sensor 100. In an embodiment, the computational cost of forecasting is determined from the initial observations based on different time periods. Based on this analysis, different forecast time periods may be evaluated to determine when the energy cost of forecasting overcomes the energy saved by suspended acquisition of observations. In an embodiment, the algorithm used for forecasting may be selected based on the computational cost of performing the forecasting. In an embodiment exponential smoothing is used in the forecasting determination to maintain a lower computational cost.

In still another embodiment, the sensor 100 may perform self-help methodologies to protect the sensor 100 from damage. For example, the sensor 100 may measure a phenomena (e.g. weather) within a range of conditions. When the conditions of the phenomena (e.g. wind) exceed or are predicted to exceed a predetermined value, the sensor 100 may perform actions to reduce the risk of damage to the sensor 100 or modules/components thereof. For example, the sensor 100 may be configured to measure the weather, including wind speed. When the wind speed exceeds a predetermined value, there may be an increased risk of damage, or unreliable measurements. In this embodiment, the sensor 100 may perform an action, such as locking the anemometer for example.

In still another embodiment, rather than lock down components of the sensor 100, the sensor 100 may decrease the time period between observations in order to acquire data on the measured phenomena. For example, in an earthquake a sensor 100 that measures vibration may increase the frequency of vibration measurements in order to obtain data of interest to the system operator.

Technical effects and benefits of some embodiments include providing a system and a method for decreasing energy usage in an autonomous sensor. The decreasing of energy usage may allow for decreasing the battery capacity of the sensor or increase the operation time of the sensor.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    measuring first data using a sensor, the sensor being operatively coupled to computing resources, the sensor having at least two power states comprising an operating power state and a low power state, the low power state consuming less energy than the operating power state;
    determining a first time period based at least in part on a forecast of when second data measured by the sensor is expected to deviate from the first data by at least a predetermined amount;
    operating the sensor and the operatively coupled computing resources at the low power state during the first time period, wherein no data measurements are acquired by the sensor during the first time period; and
    changing the sensor to the operating power state at an expiration of the first time period.

2. The method of claim 1, wherein the predetermined amount comprises a variance threshold, the method further comprising:
    determining a difference between the second data and the first data;
    determining that the difference is greater than or equal to the variance threshold; and
    transmitting a first signal from the sensor to a server in response to determining that the difference is greater than or equal to the variance threshold.

3. The method of claim 2, wherein the signal is a first signal, the method further comprising:
    determining a second time period, the second time period being an amount of time that has elapsed since the first signal was transmitted;
    determining that the second time period is greater than or equal to a time threshold; and
    transmitting a second signal from the sensor to the server in response to determining that the second time period is greater than or equal to the time threshold.

4. The method of claim 1, wherein the sensor is further operatively coupled to a battery that is powered by a solar panel, the method further comprising:
    receiving weather data,
    determining, based at least in part on the weather data, a predicted amount of solar gain the solar panel will receive over a second time period, and
    determining an expected amount of energy the battery will receive over the second time period based at least in part on the predicted amount of solar gain,
    wherein the determining the first time period further comprises determining the first time period based at least in part on the expected amount of energy the battery will receive over the second time period so as to prevent the battery from being depleted while in the operating power state.

5. The method of claim 1, further comprising determining a data trend from the first data, wherein the determining the first time period comprises determining the forecast based at least in part on the data trend.

6. The method of claim 1, wherein the determining the first time period comprises determining the forecast using a multivariate time series prediction.

7. The method of claim 1, wherein the determining the first time period comprises determining the forecast using exponential smoothing.

8. A system comprising:
    a memory storing computer readable instructions; and
    one or more processors configured to execute the computer readable instructions to:
        measure first data using a sensor, the sensor having at least two power states comprising an operating power state and a low power state, the low power state consuming less energy than the operating power state;

determining a first time period based at least in part on a forecast of when second data measured by the sensor is expected to deviate from the first data by at least a predetermined amount;

operating the sensor at the low power state during the first time period, wherein no data measurements are acquired by the sensor during the first time period; and changing the sensor to the operating power state at an expiration of the first time period.

9. The system of claim 8, wherein the predetermined amount comprises a variance threshold, and wherein the one or more processors are further configured to execute the computer readable instructions to:

determine a difference between the second data and the first data;

determine that the difference is greater than or equal to the variance threshold; and transmit a first signal from the sensor to a server in response to determining that the difference is greater than or equal to the variance threshold.

10. The system of claim 9, wherein the signal is a first signal, and wherein the one or more processors are further configured to execute the computer readable instructions to:

determine a second time period, the second time period being an amount of time that has elapsed since the first signal was transmitted;

determine that the second time period is greater than or equal to a time threshold; and transmit a second signal from the sensor to the server in response to determining that the second time period is greater than or equal to the time threshold.

11. The system of claim 8, wherein the sensor is operatively coupled to a battery that is powered by a solar panel, and wherein the one or more processors are further configured to execute the computer readable instructions to:

receive weather data;

determine, based at least in part on the weather data, a predicted amount of solar gain the solar panel will receive over a second time period; and determine an expected amount of energy the battery will receive over the second time period based at least in part on the predicted amount of solar gain, wherein the one or more processors are configured to determine the first time period by executing the computer readable instructions to determine the first time period further based at least in part on the expected amount of energy the battery will receive over the second time period so as to prevent the battery from being depleted while in the operating power state.

12. The system of claim 8, wherein the one or more processors are further configured to execute the computer readable instructions to determine a data trend, and wherein the one or more processors are configured to determine the first time period by executing the computer readable instructions to determine the forecast based on at least in part on the data trend.

13. The system of claim 8, wherein the one or more processors are configured to determine the first time period by executing the computer readable instructions to determine the forecast using a multivariate time series prediction.

14. The system of claim 8, wherein the one or more processors are configured to determine the first time period by executing the computer readable instructions to determine the forecast using exponential smoothing.

15. A computer program product, the computer program product comprising a non-transitory computer readable storage medium having program instructions embodied therewith, the program instructions executable by a processor to cause a method to be performed, the method comprising:

measuring first data using a sensor, the sensor having at least two power states comprising an operating power state and a low power state, the low power state consuming less energy than the operating power state;

determining a first time period based at least in part on data forecast of when second data measured by the sensor is expected to deviate from the first data by at least a predetermined amount;

operating the sensor at the low power state during the first time period, wherein no data measurements are acquired by the sensor during the first time period; and changing the sensor to the operating power state at an expiration of the first time period.

16. The computer program product of claim 15, wherein the predetermined amount comprises a variance threshold, the method further comprising:

determining a difference between the second data and the first data;

determining that the difference is greater than or equal to the variance threshold; and transmitting a first signal from the sensor to a server in response to determining that the difference greater than or equal to the variance threshold.

17. The computer program product of claim 16, wherein the signal is a first signal, the method further comprising:

determining a second time period, the second time period being an amount of time that has elapsed since the first signal was transmitted;

determining that the second time period is greater than or equal to a time threshold; and transmitting a second signal from the sensor to a server in response to determining that the second time period is greater than or equal to the time threshold.

18. The computer program product of claim 15, wherein the determining the first time period comprises determining the forecast using one of a multivariate time series prediction or an exponential smoothing.

19. The computer program product of claim 15, wherein the sensor is operatively coupled to a battery that is powered by a solar panel, the method further comprising:

receiving weather data;

determining, based at least in part on the weather data, a predicted amount of solar gain the solar panel will receive over a second time period; and determining an expected amount of energy the battery will receive over the second time period based at least in part on the predicted amount of solar gain, wherein the determining the first time period further comprises determining the first time period based at least in part on the expected amount of energy the battery will receive over the second time period so as to prevent the battery from being depleted while in the operating power state.

20. The computer program product of claim 15, the method further comprising determining a data trend from the first data, wherein the determining the first time period comprises determining the forecast based at least in part on the data trend.

* * * * *